Aug. 5, 1958  C. M. McKENZIE  2,845,978
TIRE APPLIANCE

Filed Nov. 27, 1956  2 Sheets-Sheet 2

INVENTOR
CLARENCE M. McKENZIE

BY  Francis J. Klempay
ATTORNEY

United States Patent Office 2,845,978
Patented Aug. 5, 1958

2,845,978

TIRE APPLIANCE

Clarence M. McKenzie, Canfield, Ohio

Application November 27, 1956, Serial No. 624,526

5 Claims. (Cl. 152—228)

The present invention relates to and has as its primary or ultimate object the provision of a new and novel tire appliance adapted to increase the traction of a vehicle tire, as for example, an automobile tire. It is also an object of the present invention to provide a tire appliance adapted to apply regular tire chains to vehicle tires in a minimum of time with a minimum of effort.

As will be readily understood, the tires employed on most power driven vehicles lose traction and slip or spin when caught in ice, snow, mud, etc., thereby prohibiting further movement of the vehicle. Although this problem has long been recognized in the art, and many types of regular and emergency tire chains have been advanced in the prior art to alleviate the same, most of these chains do not provide sufficient traction as, for example, when the driving wheels of a vehicle are deeply mired in mud, and are further characterized by their inability to be easily attached to the tire. In many instances when a vehicle is caught in mud, snow etc., movement of a short distance is all that is required to bring the vehicle onto a better driving surface and the need still exists for a tire appliance adapted to be easily attached and detached to give a vehicle tire added traction for a short distance. In addition, regular tire chains, comprising a pair of spaced linkage of chain joined throughout their length by cross links and adapted to encircle the outer periphery of a tire, are extremely hard to apply as will be understood.

In addition to the above, the trend in passenger car design has been to provide sweeping fenders which cover a good portion of the tire and come very close thereto, providing very close clearance between the sidewall of the tire and the fender. This condition has further increased the difficulty of applying any type of tire chain or appliance since the operator has only a small clearance within which to work and he usually cannot observe what he is doing. This small clearance has also rendered many earlier prior art appliances useless because of their size and complexity.

In view of the above, it is an object of the present invention to provide a new and novel tire appliance having improved gripping qualities which can be applied to a tire in a minimum of time and with a minimum of effort. In connection with this object, the tire appliance of the present invention is adapted to be applied to almost any motor vehicle regardless of the clearances involved and in such a manner that the operator need not actually observe the application of the appliance.

Another object of the invention is to provide a tire appliance of the character described which is adapted for sustained and continuous usage. The tire appliance is constructed in a strong and durable manner whereby periodic breakdowns, as for example the breaking of links in regular tire chains, are avoided.

Yet a further object of the present invention is to provide a tire appliance wherein the tire or vehicle to which it is applied is not and cannot be damaged. As will be hereinafter more fully explained, the appliance is adapted to engage the outer bead of the tire rim and the construction is such that the rim cannot become damaged by use of the present invention.

A further object of the present invention is to provide a tire appliance of the character described which also may be used to apply regular tire chains to a vehicle tire in an improved manner. With the use of the appliance disclosed herein the trouble and inconvenience associated with the application of such chains are mitigated.

A more specific object of the invention is to provide a tire appliance having the characteristics described above which comprises a minimum of component parts and yet is easily and inexpensively manufactured.

These objects, as well as other objects and advantages of the invention, will become apparent upon consideration of the detailed specification and accompanying drawing wherein there is described and shown an illustrative embodiment of the invention.

Figure 1:
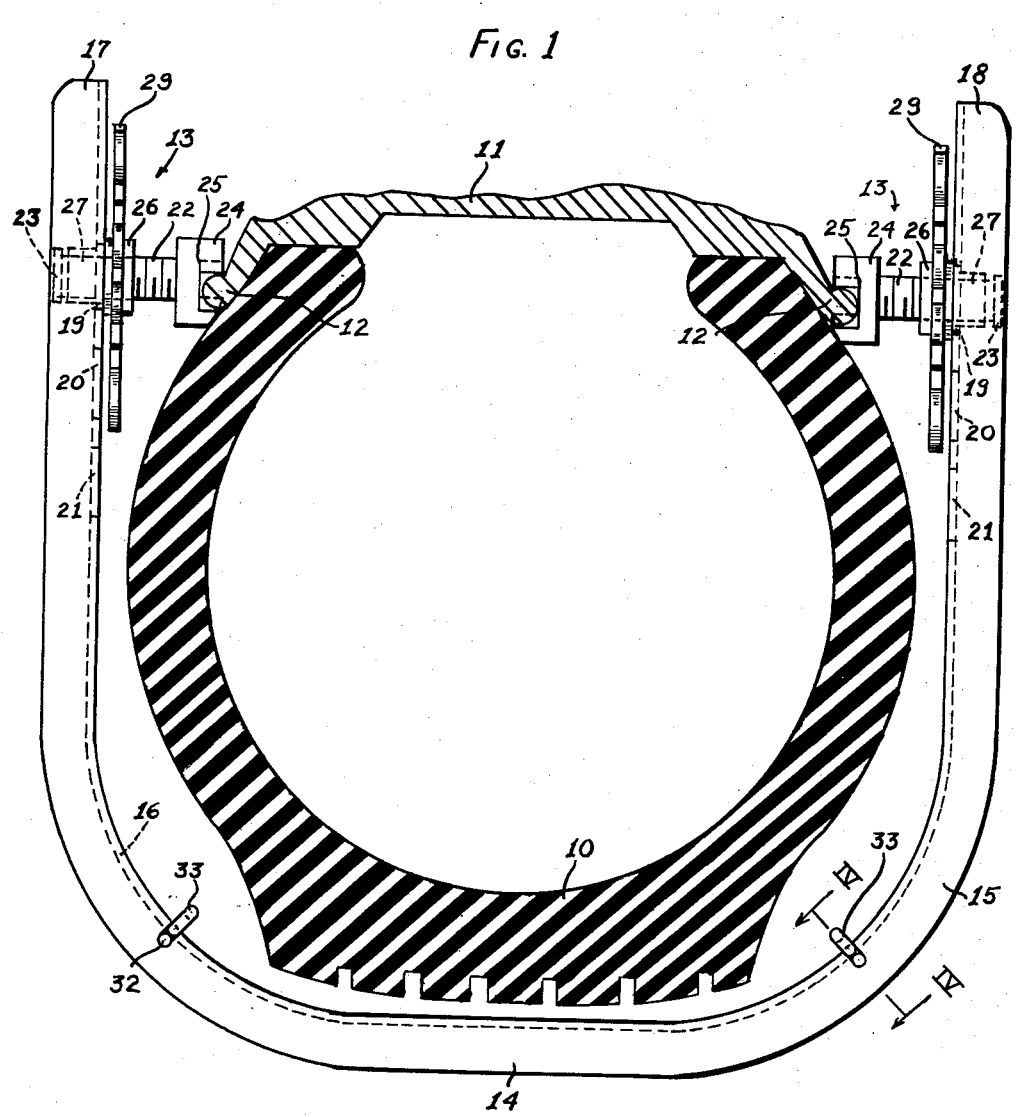
Figure 1 is an end elevational view, partially in section, showing a tire appliance constructed in accordance with the teachings of the present invention as applied to an automobile tire.
Figure 2:
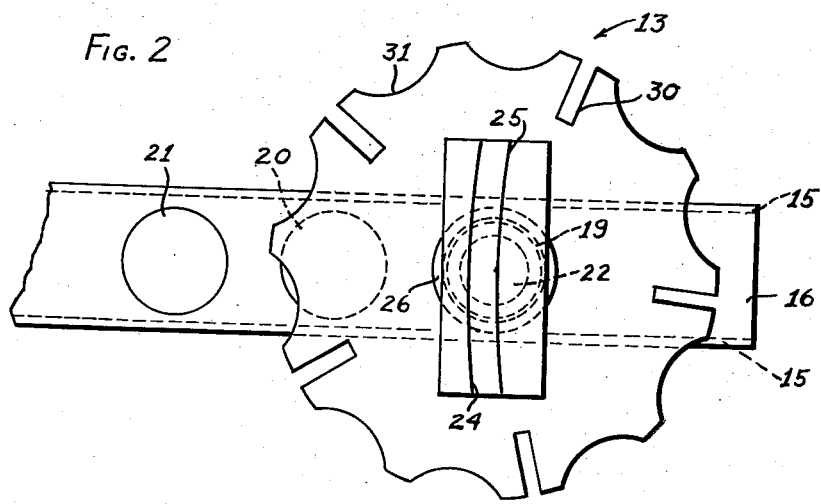
Figure 2 is a fragmentary front elevational view showing specifically one of the gripping elements employed in the appliance of the present invention.
Figure 4:
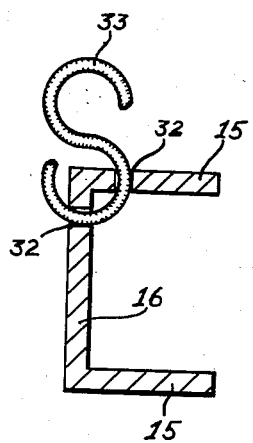
Figure 4 is a sectional view taken along the section line IV—IV, of Figure 1, depicting the chain applying means incorporated in the tire appliance of the present invention.
Figure 3:
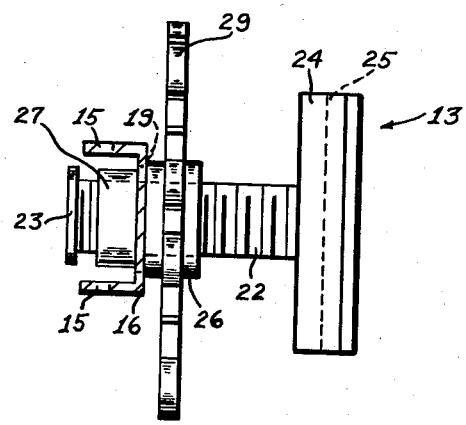
Figure 3 is a view of the clamping assembly.

Referring now to the drawing, and initially to Figure 1 thereof, the tire appliance of the present invention is shown attached in operative relation with a conventional automobile tire 10. In accordance with usual practice, the tire 10 is mounted on a circular and transversely extending rim 11 which has protruding ribs or beads 12 that extend beyond the spaced sidewalls of the tire 10. These ribs or beads 12 are engaged by clamping assemblies 13, to be hereinafter more fully explained, whose function it is to hold the tire appliance in relatively rigid relation with respect to the tire 10.

The tire appliance itself comprises a body member 14 of generally U-shaped configuration formed from channel-like material to define top and bottom walls 15 joined by a sidewall 16. It will be noted that the body member 14 is constructed in such a manner that the sidewall 16 is adjacent the tire 10. The opening provided between the legs of the U-shaped body member is slightly larger than the tire 10 whereby the same may be easily positioned around the tire during attaching operations. In accordance with the preferred teachings of my invention, the U-shaped body member 14 is formed from a single piece of channel-like material, although it is within the purview of the invention to fabricate the body member from a plurality of pieces.

The U-shaped body member 14 defines the spaced end portions 17 and 18, each of which has a plurality of aligned apertures 19—21, in the sidewall 16 thereof. These apertures are adapted to receive the removable clamping assemblies 13 so that the tire appliance may be be used with different size tires. As will be understood, different vehicles require different size tires, depending upon the diameter of the tire rim. As for example, passenger cars now being produced usually have either fourteen or fifteen inch rim diameters while some vehicles still in use embody rims of sixteen inch diameter. In using the appliance with sixteen inch diameter rim the clamping assemblies 13 would be positioned in the apertures 19 while with rims of fifteen and fourteen inch diameters the clamping assemblies 13 would be inserted in the apertures 20 and 21, respectively.

The construction of the two clamping assemblies 13 is identical and to avoid unnecessary repetition in the specification only one of these will be described. Each of the assemblies 13 is comprised of essentially two parts; the first part including a threaded shaft 22 having an enlarged head portion or stop 23 while the other end of this shaft rigidly carries, by welding or some other expedient attachment means, a clamping block 24. The clamping block 24 has the forward face thereof machined to provide a curved groove 25 having approximately the same radius of curvature as the rib or bead 12 and adapted to engage this rib. It will be observed that the clamping block 24 is considerably elongated whereby any force applied to the clamping block is distributed over a relatively large area of the rib 12 to prevent damage to the same and provide adequate clamping action.

The second part of the clamping assembly 13 comprises a threaded nut 26 received on the threaded shaft 22 and having a portion of reduced diameter 27 thereby defining an annular abutting flange which is adapted to engage the sidewall 16 of the body member 14. The portion of reduced diameter 27 is slightly smaller than the aperatures 19—21 and is therefore adapted to protrude within the body member 14. The rear surface area of the nut 26 provides an abutment surface for the head portion or stop 23 mounted on the rear end of the threaded shaft 22 to limit inward movement of this shaft with respect to the nut 26 and the body member 14. In this manner, by selecting a correct length for the shaft 22 and/or properly positioning the stop 23, the clamping block 24 can only travel a predetermined distance thereby insuring that the rib 12 of the tire rim will not be damaged.

Mounted on the enlarged portion of the nut 26, intermediate the ends of this portion, is a large ring-like washer 29 which serves as a handwheel for moving the threaded shaft 22. The handwheel 29 is rigidly attached to the internally threaded nut 26 and has a plurality of angularly related and radially extending slots 30 therein, five being shown in the drawing, which may be used to receive a tool, the blade of a screwdriver, for example, for tightening the clamping block 24 against the rim of the tire. In addition, the outer peripheral surface of the handwheel is provided with a plurality of depressions 31 which form finger-grips so that the handwheel may be easily turned. It will be noted that the handwheel 29 is of considerable size, being relatively large diametered, so that it is always accessible and is easy to manipulate.

Considering now the operation and utilization of the apparatus thus far described, the operator initially takes the tire appliance and inserts the clamping assemblies in the correct apertures depending on the size of the rim of the vehicle. As for example, if the diameter of the tire rim is sixteen inches the clamping assemblies 13 are fitted into the apertures 19 as shown in the drawing. It should be noted that the stops 23 are of such size and shape that the same will fit through any of the apertures 19—21 to allow insertion and removal of the clamping assemblies 13. The handwheels 29 are manipulated to retract the clamping blocks 24 to their retracted positions—i. e. the clamping blocks 24 abutting against the forward edge of the nuts 28.

The tire appliance is now ready to be placed on the tire and to accomplish this the operator takes one end of the U-shaped body member in each of his hands and kneels down to position the appliance around the tire. The handwheel 29 of the clamping assembly 13 on the right side of the appliance is turned until the clamping block engages the rib 12 of the tire rim. The handwheel 29 of the other clamping assembly is then turned until the clamping block 25 associates therewith engages the rib of the entire rim. The two handwheels are then tightened until the tire appliance is securely held and, if additional tightening is desired, the blade of a screwdriver or other like tool can be inserted in one of the slots 30 and used as a lever so that the rib of the tire rim is firmly clamped.

Obviously, the above described attachment procedure is characterized by its simplicity and this is especially important when it is remembered that the operator cannot usually see what he is doing, at least to the extent of the manipulation of the clamping assembly behind the tire, and that the clearances in which the operator must work are sometimes very limited. The handwheels 29 are easily turned due to their size and the plurality of finger-grips 31 while the clamping blocks 24 are adapted to readily fit over the ribs or beads of the tire rim.

As evidenced in Figure 1 of the drawing, the U-shaped body member 14 may not necessarily abut against the road-bearing surface of the tire and in this case the appliance may move or swing through a small arc but it will be understood that this may not be objectionable. When the vehicle is started the tire and rim begin to rotate causing the flat bottom portion of the body member to engage the mud, snow, etc., thereby giving the vehicle extra traction. The channel-shaped cross section of the tire appliance is well adapted to "dig" into the snow or mud and gives gripping power and traction not evidenced from the use of other types of chain apparatus.

The tire appliance may be retained on the tire as long as necessary, but it is also easily removed since the handwheels 29 need only be turned in the opposite directions and the appliance will be free.

As intimated in the objects of the invention, the tire appliance is also adapted for use in applying conventional tire chains of the type embodying a pair of spaced parallel lengths of chain joined intermediate their ends by cross links and adapted to be positioned around the outer periphery of the tire. For this purpose two small and normally related apertures 32 are positioned in the top wall 15 and the side wall 16 near the bottom of each of the end portions 17 and 18. These sets of apertures receive S-hooks 33 and it will be noted that the apertures 32 are so related that the S-hooks are always retained in proper position—that is away from and normal to the road-bearing edge portions of the tire appliance. In this manner the S-hooks 33 are protected from continuous impingement on the road or other driving surface which would very shortly break the same.

To apply permanent tire chains the tire appliance is placed around the tire and clamped on the rim thereof in exactly the manner hereinbefore described. Then the first set of links of the chains are slipped over the open ends of the S-hooks 33 and the vehicle is moved so that the tire turns one revolution and the chain is caused to drape over the outer peripheral surface of the tire. The tire appliance can then be removed and the ends of the permanent chains linked together. This operation and means of applying permanent chains is exceedingly simple when compared with the usual procedure for putting on such chains.

It should thus be apparent that I have accomplished the objects initially set forth by providing a new and novel tire appliance adapted to increase the traction of a vehicle and also adapted for use in applying regular chains on a tire. However, since many changes may be made in the illustrated embodiment of the invention without departing from the clear teaching thereof, reference should be had to the following appended claims in determining the scope of the invention.

I claim:

1. A tire appliance of the type adapted to be applied in transverse relation to the road-bearing tread of a tire which is mounted on a circular rim comprising a generally U-shaped body member defining spaced leg portions and a generally flat bottom portion, a plurality of aligned apertures near the end of each of said leg portions of said body member, clamping means detachably mounted near the ends of each of said leg portions, each of said clamping means comprising a threaded shaft, a clamping block mounted on one end of said threaded shaft, a nut threadably received on said shaft, said nut having a portion of reduced diameter thereby defining a flange, said flange adapted to abut against said body member with said portion of reduced diameter and said threaded shaft adapted to protrude through one of said apertures, and said clamping means being removable from said last mentioned aperture and adapted to be received in others of said plurality of apertures whereby said tire appliance may be used with tire rims and tires of different diameters.

2. Apparatus according to claim 1 further characterized in that said appliance comprises a stop mounted on said shaft rearwardly of said nut and said clamping block, said stop adapted to engage the rearward end of said nut to limit the movement of said clamping block, and said stop being of smaller size than said plurality of apertures.

3. Apparatus according to claim 1 further characterized in that said appliance comprises a handwheel mounted on said nut, said handwheel having a plurality of radially extending slots therein, and indentations on the outer peripheral edge of said handwheel defining finger-grips.

4. A tire appliance of the type adapted to be applied in transverse relation to the road-bearing tread of a tire which is mounted on a circular rim comprising a generally U-shaped body member defining spaced leg portions and a generally flat bottom portion, clamping means mounted on said body member near the end of each of said leg portions, means for moving said clamping means toward and away from each other into clamping relation with the edges of the tire rim, and means for detachably mounting said clamping means at spaced points along the length of said leg portions whereby said appliance may be used with tires and tire rims of different diameters.

5. Apparatus according to claim 4 further characterized in that said tire appliance further comprises holding means carried by said body member near the other ends of said leg portions, and said holding means adapted for use in applying tire chains on the tire.

References Cited in the file of this patent

UNITED STATES PATENTS

| | | |
|---|---|---|
| 1,250,781 | Blair | Dec. 18, 1917 |
| 1,571,764 | Edwards | Feb. 2, 1926 |
| 1,914,760 | Stiles | June 20, 1933 |
| 2,664,934 | Safran | Jan. 5, 1954 |